US012410899B2

(12) United States Patent
Imamura et al.

(10) Patent No.: US 12,410,899 B2
(45) Date of Patent: Sep. 9, 2025

(54) LAMP UNIT FOR VEHICULAR HEADLAMP, AND VEHICULAR HEADLAMP

(71) Applicant: Ichikoh Industries, Ltd., Isehara (JP)

(72) Inventors: Hiroya Imamura, Isehara (JP); Kazunori Iwasaki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/722,282

(22) PCT Filed: Dec. 19, 2022

(86) PCT No.: PCT/JP2022/046712
§ 371 (c)(1),
(2) Date: Jun. 20, 2024

(87) PCT Pub. No.: WO2023/127579
PCT Pub. Date: Jul. 6, 2023

(65) Prior Publication Data
US 2025/0052387 A1    Feb. 13, 2025

(30) Foreign Application Priority Data
Dec. 28, 2021 (JP) .................................. 2021-215032

(51) Int. Cl.
*F21S 41/143*    (2018.01)
*B60Q 1/04*    (2006.01)
(Continued)

(52) U.S. Cl.
CPC .............. *F21S 41/143* (2018.01); *B60Q 1/04* (2013.01); *F21S 41/151* (2018.01); *F21S 41/30* (2018.01)

(58) Field of Classification Search
CPC ... F21Y 2103/10; F21S 41/143; F21S 41/151; F21S 41/30; B60Q 1/04; F21V 7/04; F21V 7/046; F21V 7/08; F21V 7/09
See application file for complete search history.

(56) References Cited

U.S. PATENT DOCUMENTS

| 2013/0135885 | A1* | 5/2013 | Anzai ................... | F21S 41/151 |
| | | | | 362/511 |
| 2019/0145596 | A1 | 5/2019 | Suetsugu | |
| 2020/0256534 | A1* | 8/2020 | Ikuta ..................... | F21S 41/151 |

FOREIGN PATENT DOCUMENTS

| CN | 113874653 A | * 12/2021 | ............ F21S 41/148 |
| EP | 2518393 A2 | * 10/2012 | ............ F21S 41/143 |

(Continued)

OTHER PUBLICATIONS

International Search Report issued on Feb. 21, 2023, in PCT/JP2022/046712 filed on Dec. 19, 2022, 2 pages.

(Continued)

*Primary Examiner* — Erin Kryukova
(74) *Attorney, Agent, or Firm* — Oblon, McClelland, Maier &Neustadt, L.L.P.

(57) ABSTRACT

An object of the present invention is to provide a lamp unit for a vehicular headlamp and a vehicular headlamp, by which it is possible to diffuse left and right ends of a high-beam light distribution pattern further to the left and right. An inner reflecting surface reflects light from a first light-emitting element as reflected light onto a lens. The lens emits the reflected light in a diffused light distribution pattern toward a front of a vehicle. An edge of a diffused light distribution pattern on an outer side of the vehicle is located further to an outer side of the vehicle than an edge of a first partial light distribution pattern on the outer side of the vehicle. As a result, left and right ends of an overall high-beam light distribution pattern can be diffused further to the left and right.

10 Claims, 10 Drawing Sheets

(51) Int. Cl.
     *F21S 41/151*          (2018.01)
     *F21S 41/30*           (2018.01)

(56) References Cited

FOREIGN PATENT DOCUMENTS

| | | | |
|---|---|---|---|
| EP | 2 543 927 a2 | 1/2013 | |
| JP | 2007-227228 A | 9/2007 | |
| JP | 2013-110068 A | 6/2013 | |
| JP | 2013-161577 A | 8/2013 | |
| JP | 2014-120452 A | 6/2014 | |
| JP | 5666882 b2 | 2/2015 | |
| JP | 2016-115641 | 6/2016 | |
| JP | 6105919 B2 * | 3/2017 | ............ F21S 41/143 |
| JP | 2020-135924 A | 8/2020 | |

OTHER PUBLICATIONS

Japanese Office Action issued Mar. 11, 2025 in Japanese Patent Application No. 2021-215032, (with unedited computer-generated English translation), 11 pages.
Extended European Search Report dated Jul. 30, 2025 issued in corresponding European Patent Application No. 22915803.5, citing Doc. Nos. 1 and 15-17, 10 pages.

* cited by examiner

LAMP UNIT FOR VEHICULAR HEADLAMP, AND VEHICULAR HEADLAMP

TECHNICAL FIELD

The present invention relates to a lamp unit for a vehicular headlamp (headlamp). The present invention also relates to a vehicular headlamp (headlamp).

BACKGROUND ART

For example, PTL 1 and 2 below describe examples of variable light distribution type lamp units that change a high-beam light distribution pattern (main beam light distribution pattern) in response to a vehicle in front such as an oncoming vehicle and a preceding vehicle, that is, so-called Adaptive Driving Beam (ADB) type lamp units and vehicular headlamps provided with such lamp units. PTL 1 and 2 will be described below.

The vehicular lighting unit of PTL 1 includes a projection lens and a light source unit. The light source unit includes a plurality of tubular portions arranged in a row in the horizontal direction and having an inner circumferential surface on which a reflecting surface is formed, and a plurality of semiconductor light-emitting elements each arranged at an incident opening at one end of each of the plurality of tubular portions.

The operation of the vehicular lighting unit of PTL 1 will be described below. Light from the plurality of semiconductor light-emitting elements enters the incident openings of the plurality of tubular portions, is reflected by the reflecting surfaces of the plurality of tubular portions, exits from emission openings at the other ends of the plurality of tubular portions, and is emitted from the projection lens toward the front of the vehicle as a light distribution pattern including a plurality of illumination areas. By performing control to individually turn on and off (decrease the light intensity of) the plurality of semiconductor light-emitting elements, a light distribution pattern including a plurality of illumination areas changes.

The vehicular lighting unit of PTL 1 uses the reflecting surfaces on the inner circumferential surfaces of the plurality of tubular portions to form a uniform or a specific luminous intensity distribution in a plurality of illumination areas. Further, in the vehicular lighting unit of PTL 1, it is possible to position the vertical edges of the emission openings of the plurality of tubular portions rearward (toward the plurality of semiconductor light-emitting elements) from the rear focal surface of the projection lens, and thus, prevent the formation of dark streaks (gap streaks) and bright streaks (light streaks) caused by the vertical edges between the plurality of illumination areas, and adjust and mitigate brightness unevenness (uneven light distribution).

The vehicular headlamp of PTL 2 includes a plurality of semiconductor light-emitting elements arrayed in the left-right direction, reflectors provided above, below, left and right on the side of the light-emitting surface of each of the plurality of semiconductor light-emitting elements, and a projection lens.

The operation of the vehicular headlamp of PTL 2 will be described below. Light from the plurality of semiconductor light-emitting elements is emitted in a plurality of light distribution portions, and the plurality of light distribution portions are synthesized to form a light distribution pattern, which is emitted from the projection lens toward the front of the vehicle. By performing control to individually turn on and off of the plurality of semiconductor light-emitting elements, the areas between the light distribution portions form dark portions (non-illuminated areas), and the light distribution pattern formed from the plurality of light distribution portions changes.

The vehicular headlamp of PTL 2 distributes light from the plurality of semiconductor light-emitting elements, that is, reflected light from the plurality of reflectors to boundary portions of light distribution areas of direct light, that is, boundary portions of the plurality of light distribution portions (light-free areas), and thus, eliminates unevenness from streaks in the vertical direction (dark portions in the vertical direction) to form an excellent light distribution pattern.

CITATION LIST

Patent Literature

PTL 1: JP 2013-110068 A
PTL 2: JP 2014-120452 A

SUMMARY OF THE INVENTION

Problems to be Solved by the Invention

The above-described variable light distribution type lamp unit and a vehicular headlamp provided with the lamp unit improve the visibility by diffusing both left and right sides of a high-beam light distribution pattern (main beam light distribution pattern) and thus, can contribute to traffic safety.

In the vehicular lighting unit of PTL 1, a means is provided for suppressing the formation of dark streaks (gap streaks) and bright streaks (light streaks) caused by vertical edges between a plurality of illumination areas and adjusting and mitigating brightness unevenness (uneven light distribution). However, no means is provided for diffusing both the left and right sides of a high-beam light distribution pattern (main beam light distribution pattern).

Further, in the vehicular headlamp of PTL 2, a means is provided for distributing reflected light from a plurality of reflectors to boundary portions of light distribution areas of direct light, that is, boundary portions of the plurality of light distribution portions (light-free areas), and thus, eliminate unevenness from streaks in the vertical direction (dark portions in the vertical direction). However, no means is provided for diffusing both the left and right sides of the high-beam light distribution pattern (main beam light distribution pattern).

As a result, in the vehicular lighting unit of PTL 1 and the vehicular headlamp of PTL 2, it is not possible to diffuse the left and right ends of the high-beam light distribution pattern further to the left and right.

An object to be solved by the present invention is to provide a lamp unit for a vehicular headlamp and a vehicular headlamp, by which it is possible to diffuse the left and right ends of the high-beam light distribution pattern further to the left and right.

Means for Solving the Problem

A lamp unit for a vehicular headlamp according to the present invention is a lamp unit for a vehicular headlamp mounted on a front part of a vehicle and includes a light source including a plurality of light-emitting elements arrayed in a horizontal direction from left to right, a lens arranged in front of the light source, and an inner reflecting surface provided further on an inner side of a vehicle than the plurality of light-emitting elements, and in the lamp unit, the inner reflecting surface reflects light from an innermost light-emitting element located furthest to the inner side of the vehicle among the plurality of light-emitting elements, as reflected light onto the lens, and the lens emits light from the plurality of light-emitting elements toward a front of the vehicle in a plurality of partial light distribution patterns arrayed in the horizontal direction from left to right, and emits the reflected light from the inner reflecting surface toward a front of the vehicle as a diffused light distribution pattern, so that the diffused light distribution pattern is superimposed on an outermost partial light distribution pattern located furthest on an outer side of the vehicle among the partial light distribution patterns, and so that an edge of the diffused light distribution pattern on an outer side of the vehicle is located further on the outer side of the vehicle than an edge of the outermost partial light distribution pattern on the outer side of the vehicle.

In the lamp unit for a vehicular headlamp according to the present invention, it is preferable that an area of the diffused light distribution pattern is narrower than an area of the outermost partial light distribution pattern.

In the lamp unit for a vehicular headlamp according to the present invention, it is preferable that the inner reflecting surface reflects light from a next innermost light-emitting element located adjacent to the innermost light-emitting element onto an area other than the lens.

In the lamp unit for a vehicular headlamp according to the present invention, it is preferable that the inner reflecting surface is formed of any surface, reflects light from the innermost light-emitting element onto an effective portion of the lens, the effective portion being located further to an inner side of the vehicle than an optical axis of the lens and above the optical axis of the lens, and reflects the light from the next innermost light-emitting element onto an area other than the effective portion of the lens, the area being located above the optical axis of the lens.

In the lamp unit for a vehicular headlamp according to the present invention, the lamp unit includes an outer reflecting surface provided further on an outer side of the vehicle than the plurality of light-emitting elements, and it is preferable that the outer reflecting surface reflects light from an outermost light-emitting element located furthest to an outer side of the vehicle as reflected light onto the lens, and the lens emits the reflected light from the outer reflecting surface toward a front of the vehicle as an additional light distribution pattern, to add the reflected light to an innermost partial light distribution pattern located furthest to an inner side of the vehicle.

In the lamp unit for a vehicular headlamp according to the present invention, it is preferable that the outer reflecting surface is formed from an ellipsoidal surface in which a first focal point is located on the outermost light-emitting element and a second focal point is located on an incident surface of the lens, and reflects light from the outermost light-emitting element onto an effective portion of the lens, the effective portion being located further on the outer side of the vehicle than light from the innermost light-emitting element which is reflected light from the inner reflecting surface.

In the lamp unit for a vehicular headlamp according to the present invention, the lamp unit includes a reflector arranged between the light source and the lens, and it is preferable that the reflector includes a reflecting surface that reflects light from the plurality of light-emitting elements onto the lens, and the lens superimposes the light from the plurality of light-emitting elements and light from the reflecting surface and emits obtained light toward a front of the vehicle as a plurality of partial light distribution patterns.

In the lamp unit for a vehicular headlamp according to the present invention, it is preferable that the inner reflecting surface and the outer reflecting surface are provided on the reflector.

A vehicular headlamp according to the present invention is a vehicular headlamp mounted on each of a left side and a right side of a front part of a vehicle, and includes a lamp housing and a lamp lens that form a lamp chamber, and the lamp unit for a vehicular headlamp according to the present invention.

Effect of the Invention

The lamp unit for a vehicular headlamp and the vehicular headlamp according to the present invention can diffuse left and right ends of a high-beam light distribution pattern further to the left and right.

BRIEF DESCRIPTION OF THE DRAWINGS

FIG. 5A is an explanatory diagram illustrating the outermost partial light distribution pattern (the first partial light distribution pattern) on which a diffused light distribution pattern is superimposed. FIG. 5B is an explanatory diagram illustrating the outermost partial light distribution pattern (the first partial light distribution pattern) on which the diffused light distribution pattern is not superimposed. FIG. 5C is an explanatory diagram illustrating the diffused light distribution pattern.

FIGS. 6A and 6B are explanatory diagrams illustrating the next outermost partial light distribution pattern (the second partial light distribution pattern). FIG. 6C is an explanatory diagram illustrating a state where the light distribution pattern is not formed.

FIG. 7A is an explanatory diagram illustrating the innermost partial light distribution pattern (the tenth partial light distribution pattern) to which an additional light distribution pattern is added. FIG. 7B is an explanatory diagram illustrating the innermost partial light distribution pattern (the tenth partial light distribution pattern) to which the additional light distribution pattern is not added. FIG. 7C is an explanatory diagram illustrating the additional light distribution pattern.

FIGS. 8A and 8B are explanatory diagrams illustrating the next innermost partial light distribution pattern (the ninth partial light distribution pattern). FIG. 8C is an explanatory diagram illustrating a state where the light distribution pattern is not formed.

FIG. 9A is an explanatory diagram illustrating a left high-beam light distribution pattern emitted from a lamp unit of a left vehicular headlamp. FIG. 9B is an explanatory diagram illustrating a right high-beam light distribution pattern emitted from the lamp unit of the right vehicular headlamp.

MODE FOR CARRYING OUT THE INVENTION

Figure 1:
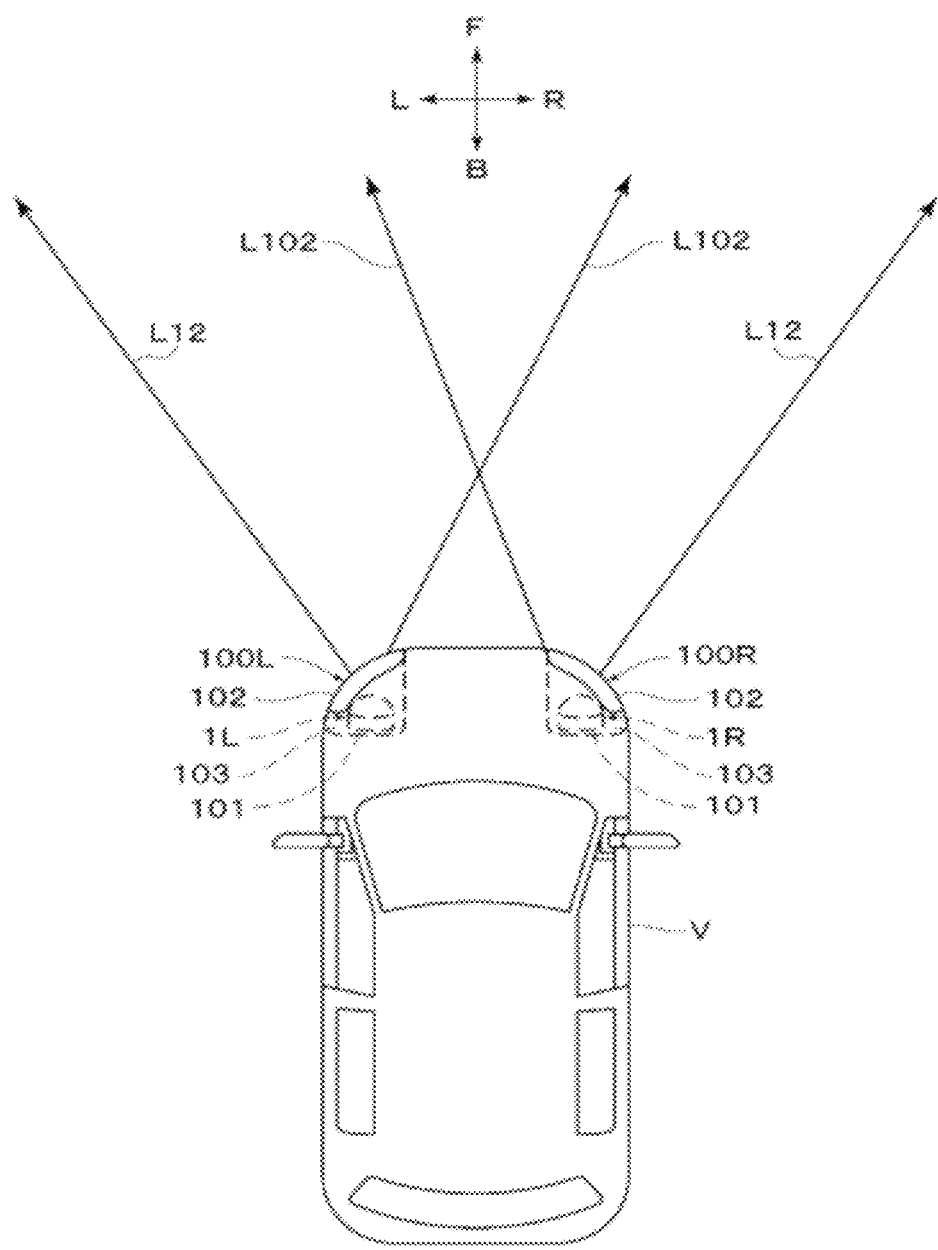
FIG. 1 is a plan view illustrating an embodiment of a lamp unit for a vehicular headlamp and a vehicular headlamp according to the present invention in a usage state (in a state of being mounted on a vehicle).

An example of an embodiment (example) of a lamp unit for a vehicular headlamp and a vehicular headlamp according to the present invention will be described in detail below with reference to the drawings. In the present specification and the appended claims, front, rear, up, down, left, and right refer to front, rear, up, down, left, and right when the lamp unit for a vehicular headlamp and the vehicular headlamp according to the present invention are mounted on a vehicle. In the present specification and the appended claims, an inner side of the vehicle refers to a center side in a left-right direction of the vehicle, and an outer side of the vehicle refers to a left side and a right side of the vehicle with respect to the center in the left-right direction of the vehicle.

The drawings are schematic diagrams, and thus, only main components are illustrated, and components other than the main components are not illustrated, and a part of the hatching is omitted. In FIGS. 1 to 4, reference numeral "F" refers to "front", reference numeral "B" refers to "rear", reference numeral "U" refers to "up", reference numeral "D" refers to "down", reference numeral "L" refers to "left", and reference numeral "R" refers to "right". Further, in the longitudinal sectional view of FIG. 3, reference numerals "30R", "31R", and "LED6 to LED 10" of components that are not illustrated are mentioned for the sake of convenience. Moreover, in FIGS. 5 to 12, reference numeral "VU-VD" indicates a vertical line from top to bottom in a screen, and reference numeral "HL-HR" indicates a horizontal line from left to right in the screen. Further, in the iso-luminosity lines in FIGS. 5 to 8, the luminosity value of the iso-luminosity line in the center is high, and the luminosity value of the iso-luminosity lines decreases toward the outside (outer periphery).

Description of Configuration of Embodiment

Configurations of lamp units 1L and 1R of a vehicular headlamp according to the present embodiment (hereinafter, referred to as "lamp units 1L and 1R") and vehicular headlamps 100L and 100R of the present embodiment (hereinafter, referred to as "vehicular headlamps 100L and 100R") will be described below.

(Description of Vehicular Headlamps 100L and 100R)

As illustrated in FIG. 1, a left vehicular headlamp 100L is mounted on the left side of a front part of a vehicle V, and a right vehicular headlamp 100R is mounted on the right side of the front part of the vehicle V.

As illustrated in FIG. 1, the vehicular headlamps 100L and 100R each include a lamp housing 101, a lamp lens 102, the lamp unit 1L or 1R, and a control device (not illustrated).

The lamp housing 101 is formed of a light-impermeable resin material. The lamp lens 102 is formed of a light-transmitting resin material. The lamp lens 102 serves as an outer lens or an outer cover. As illustrated in FIG. 1, the shape of the surface of the lamp lens 102 (a surface opposite to the surface on the side of a lamp chamber 103 described below) in a plan view is a slanted shape that gradually recedes from the front to the rear of the vehicle V from the inner side of the vehicle to the outer side of the vehicle, along the design surface of the vehicle V. The lamp housing 101 and the lamp lens 102 form the lamp chamber 103. The lamp units 1L and 1R are arranged in the lamp chamber 103.

(Description of Control Device)

The control device is not illustrated, but is mounted in the vehicle V. The control device includes a detection portion, a detection control portion, and a light on/off control portion.

For example, the detection portion includes an imaging device (camera) arranged in the center of an upper edge of a front windshield of the vehicle V, a millimeter wave radar arranged in the center of a front grille of the vehicle V, and the like.

The imaging device captures an image including an oncoming vehicle V1 and a preceding vehicle V2 relative to a host vehicle V (using the same reference numeral "V" as the vehicle). The millimeter wave radar measures the distance to the oncoming vehicle V1 and the preceding vehicle V2 from the host vehicle V. The detection portion outputs a detection signal to the detection control portion via an interface.

The detection control portion is an electronic control unit (ECU) for detection control, and includes an arithmetic control electronic device such as a micro-processing unit (MPU) and a central processing unit (CPU), and a storage electronic device such as a random access memory (RAM) and a read-only memory (ROM). The detection control portion calculates the position and the distance of the oncoming vehicle V1 and the preceding vehicle V2, based on the detection signal from the detection portion by causing the arithmetic control electronic device to execute a predetermined program stored in the storage electronic device, and outputs a calculation signal to the light on/off control portion via the interface.

The light on/off control portion is an ECU that executes control for turning the light on and off, and includes an arithmetic control electronic device such as an MPU and a CPU, and an electronic storage device such as a RAM and a ROM. The light on/off control portion causes the arithmetic control electronic device to execute a predetermined program stored in the storage electronic device, to perform control for turning on and off, and increasing or decreasing the light intensity of a plurality of light-emitting elements (in the present example, ten light-emitting elements LED1 to LED10) described later, based on the calculation signal from the detection control portion.

(Description of Lamp Units 1L and 1R)

The left lamp unit 1L of the left vehicular headlamp 100L emits a left high-beam light distribution pattern PL to the front of the vehicle V, as illustrated in FIG. 9A. The right lamp unit 1R of the right vehicular headlamp 100R emits a right high-beam light distribution pattern PR to the front of the vehicle V, as illustrated in FIG. 9B.

Figure 10:
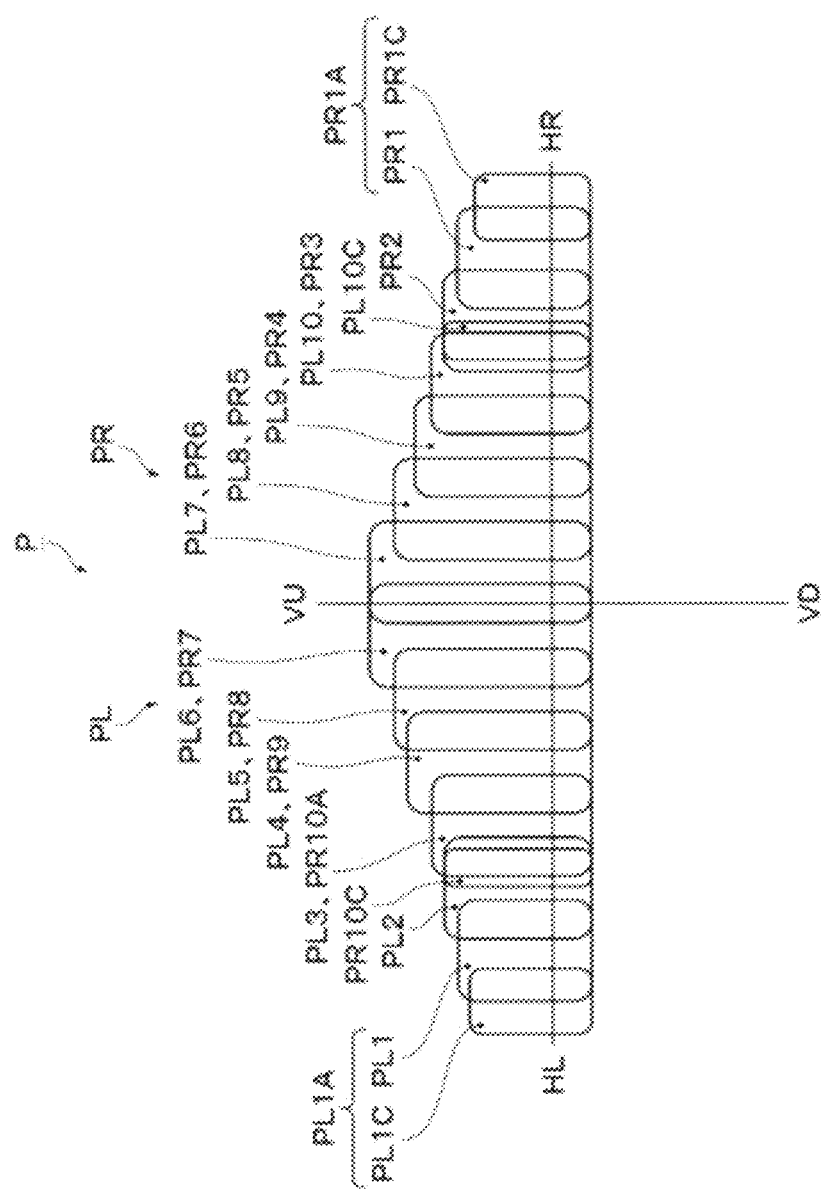
FIG. 10 is an explanatory diagram illustrating an overall high-beam light distribution pattern synthesized by superimposing the left high-beam light distribution pattern (see FIG. 9A) emitted from the lamp unit of the left vehicular headlamp and the right high-beam light distribution pattern (see FIG. 9B) emitted from the lamp unit of the right vehicular headlamp.

The left high-beam light distribution pattern PL and the right high-beam light distribution pattern PR are superimposed to form an overall high-beam light distribution pattern P, as illustrated in FIG. 10. In the present example, the overall high-beam light distribution pattern P is a wide high-beam light distribution pattern that illuminates a wide range from an area near the front of the vehicle V to an area far from the vehicle V with high luminous intensity.

The lamp units 1L and 1R are lamp units having variable light distribution, and are so-called Adaptive Driving Beam (ADB) type lamp units. When there is no vehicle such as the oncoming vehicle V1 and the preceding vehicle V2 in front, the lamp units 1L and 1R emit the overall high-beam light distribution pattern P illustrated in FIG. 10. On the other hand, when a vehicle is present in front, the lamp units 1L and 1R perform control so that an area in which the vehicle is present (an area illustrated by dashed lines in FIGS. 11 and 12) is darker than surrounding areas (areas illustrated by solid lines in FIGS. 11 and 12).

That is, the lamp units 1L and 1R cause the control device to perform control for turning on or off, and increasing or decreasing the light intensity of the light-emitting elements LED1 to LED10 of a light source 2 described below, to turn off or decrease the light intensity of a partial light distribution pattern described below in which a vehicle is present in front, to change the overall high-beam light distribution pattern P.

(Description of Right Lamp Unit 1R)

The right lamp unit 1R will be described below with reference to FIGS. 2 to 4. Here, in the right lamp unit 1R, the outer side of the vehicle is the right side of the vehicle V and the inner side of the vehicle is the left side of the vehicle V, and hereinafter, the "outer side of the vehicle" will be referred to as the "right side" and the "inner side of the vehicle" will be referred to as the "left side". On the other hand, in the left lamp unit 1L, the outer side of the vehicle is the left side of the vehicle V and the inner side of the vehicle is the right side of the vehicle V, and hereinafter, the "outer side of the vehicle" will be referred to as the "left side" and the "inner side of the vehicle" will be referred to as the "right side".

The left lamp unit 1L has a configuration that is substantially similar to the configuration of the right lamp unit 1R, but in which the left side and the right side are reversed. Therefore, the description of the left lamp unit 1L and illustrations similar to those in FIGS. 2 to 4 will be omitted. Further, the expressions "left and right sides", "left side", and "right side" will be omitted as appropriate.

The lamp unit 1R includes a light source 2, a reflector 3, a lens 4, a heat sink 5, and a fan unit 6. The light source 2, the reflector 3, the lens 4, the heat sink 5, and the fan unit 6 are attached to a frame member (not illustrated), and are also attached to the lamp housing 101 via a frame member and a bracket member (not illustrated).

(Description of Light Source 2)

Figure 2:
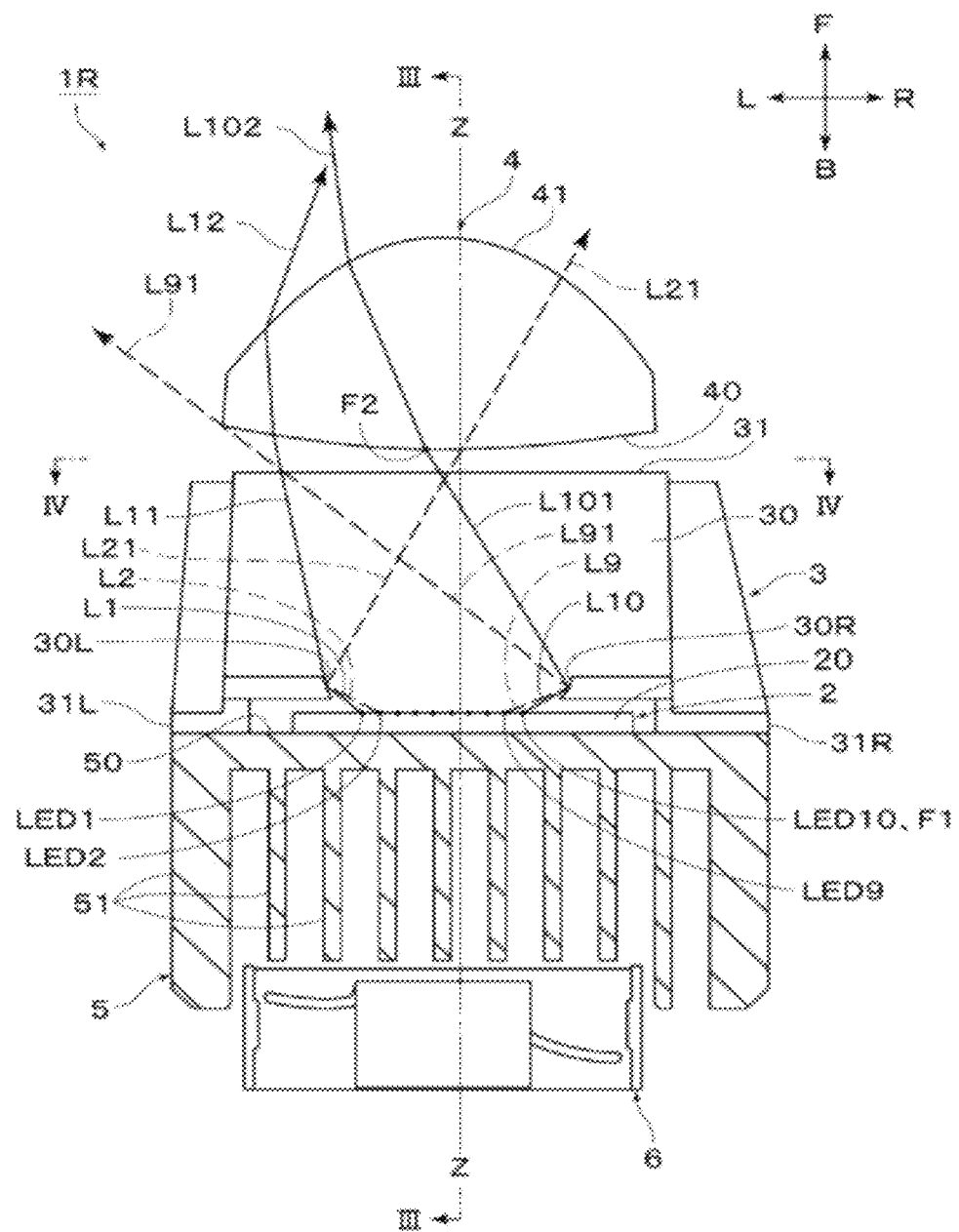
FIG. 2 is a traverse sectional view (a horizontal sectional view, a view taken along line II-II marked by arrows in FIG. 3, and a view taken along line II-II marked by arrows in FIG. 4) illustrating a lamp unit of a right vehicular headlamp.
Figure 3:
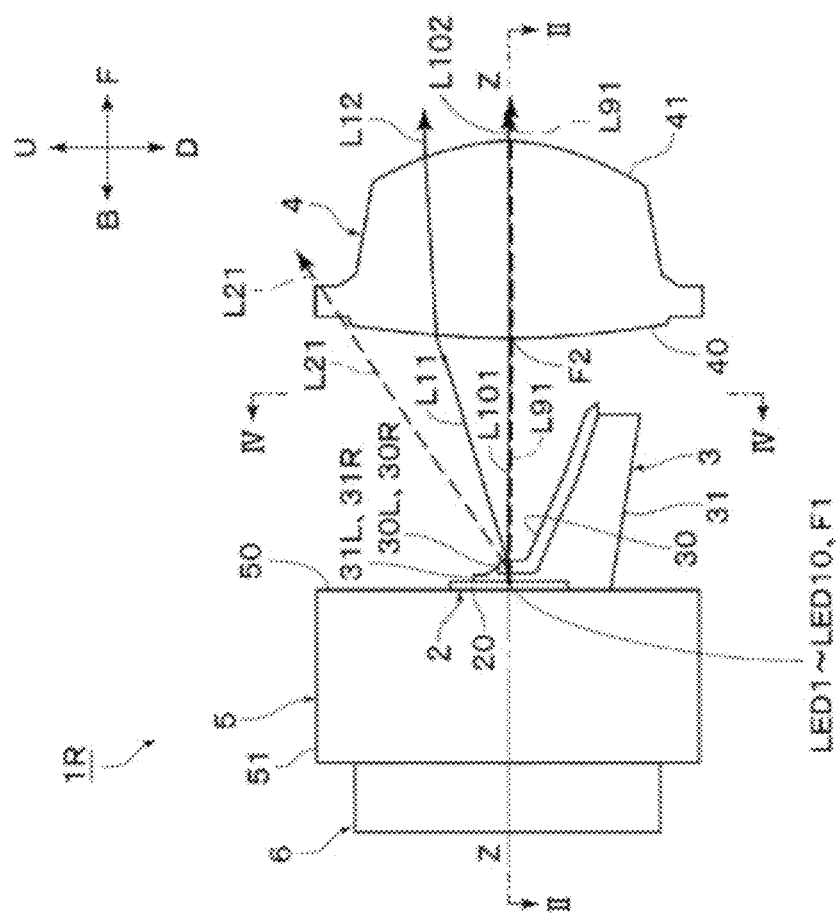
FIG. 3 is a longitudinal sectional view (a vertical sectional view, a sectional view taken along line III-III in FIG. 2, and a sectional view taken along line III-III in FIG. 4) illustrating the lamp unit of the right vehicular headlamp.
Figure 4:
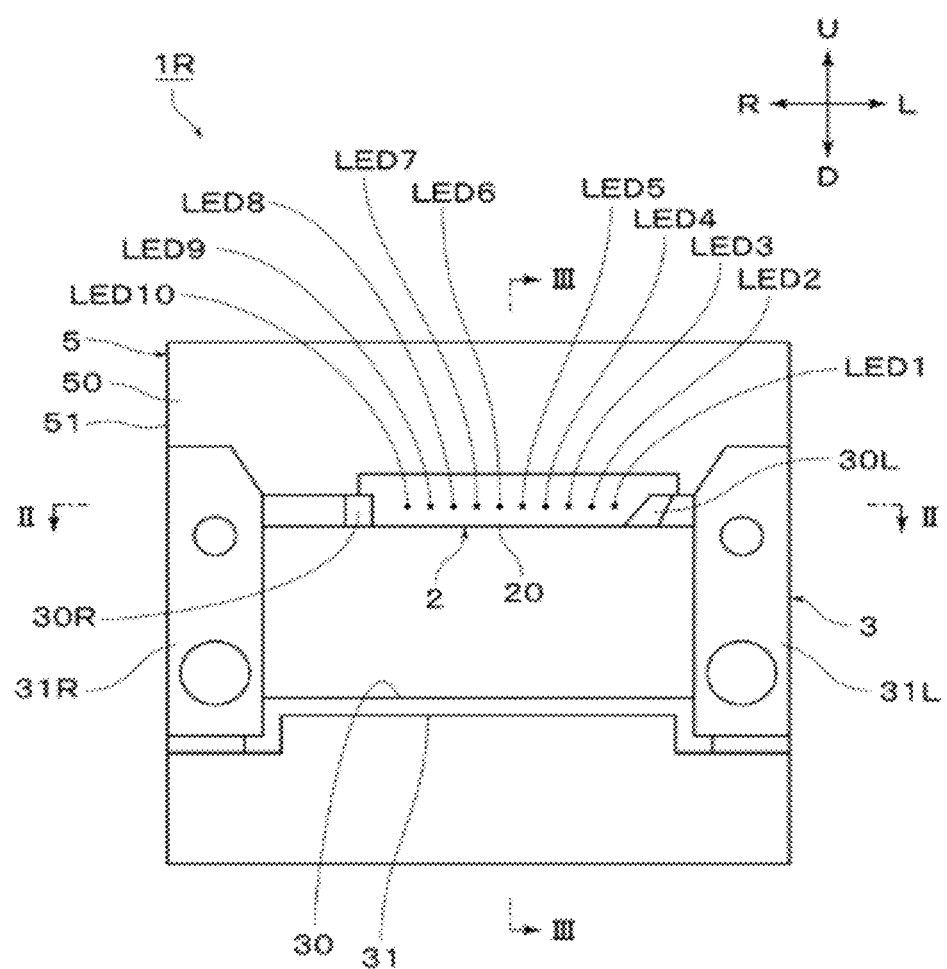
FIG. 4 is a front view illustrating the lamp unit of the right vehicular headlamp in a state where a lens is removed (a view taken along line IV-IV marked by arrows in FIG. 2, and a view taken along line IV-IV marked by arrows in FIG. 3).
Figure 5:
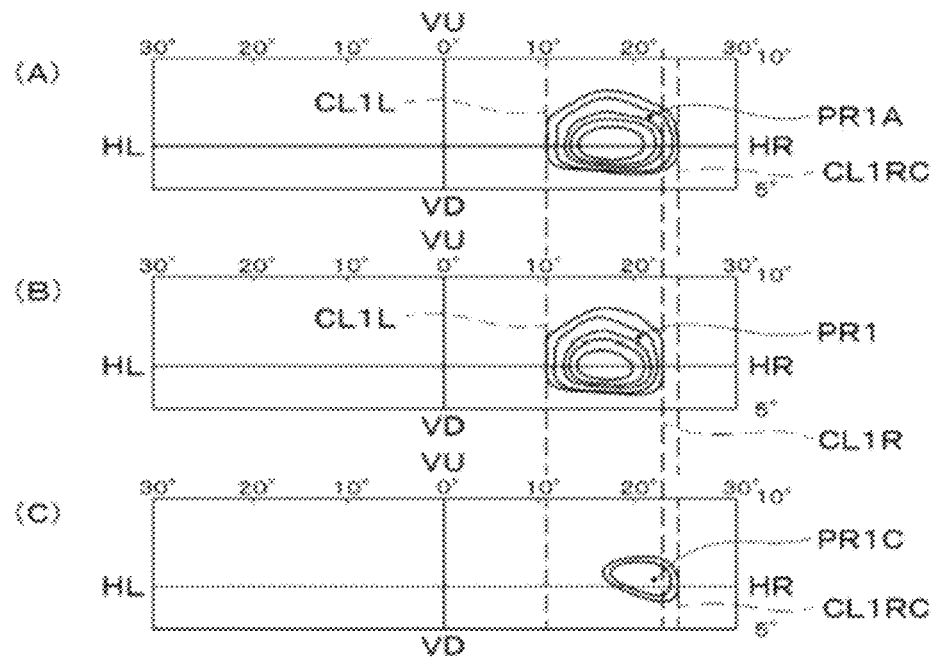
FIG. 5 is an explanatory diagram illustrating an outermost partial light distribution pattern (a first partial light distribution pattern) formed by the lamp unit of the right vehicular headlamp.
Figure 6:
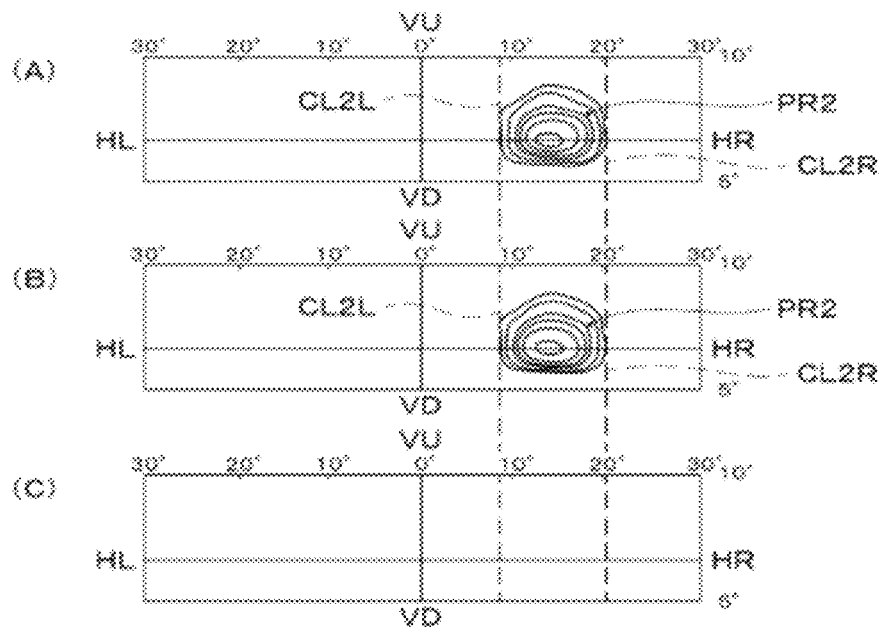
FIG. 6 is an explanatory diagram illustrating a next outermost partial light distribution pattern (a second partial light distribution pattern) formed by the lamp unit of the right vehicular headlamp.
Figure 7:
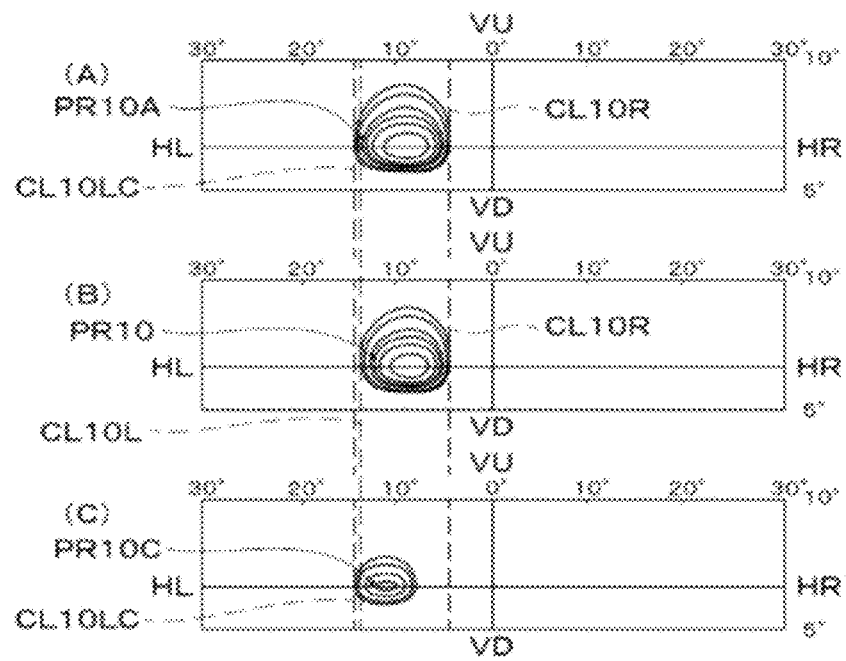
FIG. 7 is an explanatory diagram illustrating an innermost partial light distribution pattern (a tenth partial light distribution pattern) formed by the lamp unit of the right vehicular headlamp.
Figure 8:
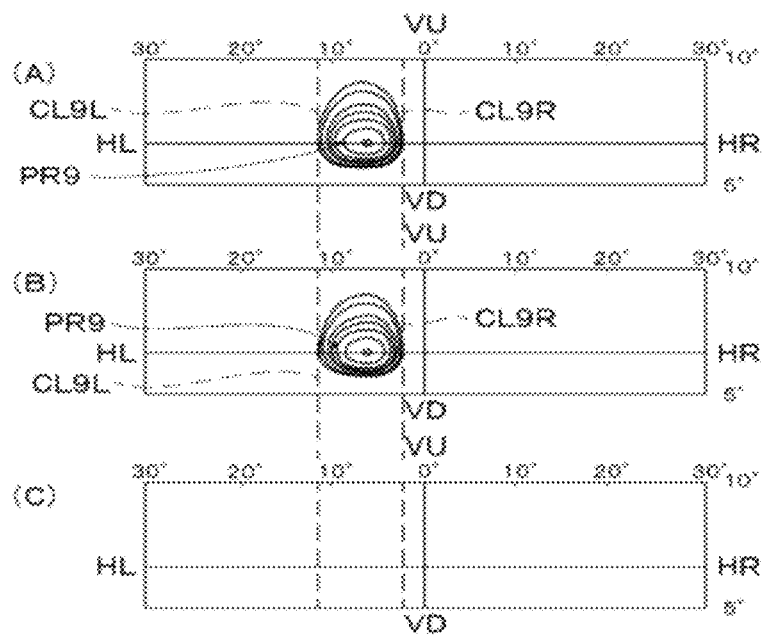
FIG. 8 is an explanatory diagram illustrating a next innermost partial light distribution pattern (a ninth partial light distribution pattern) formed by the lamp unit of the right vehicular headlamp.

As illustrated in FIGS. 2 to 4, the light source 2 includes a plurality of light-emitting elements, in the present example, ten light-emitting elements LED1, LED2, LED3, LED4, LED5, LED6, LED7, LED8, LED9, and LED10 (hereinafter, referred to as "LED1 to LED10"), and a substrate 20. Here, the ten light-emitting elements LED1 to LED10 are referred to as a first light-emitting element LED1 to a tenth light-emitting element LED10 from the left.

That is, among the ten light-emitting elements LED1 to LED10, a light-emitting element located at a leftmost position (on the inner side of the vehicle) (an innermost light-emitting element described in the claims) is the first light-emitting element LED1. A light-emitting element located in an adjacent position to the right of the first light-emitting element LED1 (a next innermost light-emitting element described in the claims) is a second light-emitting element LED2. Among the ten light-emitting elements LED1 to LED10, a light-emitting element located at the rightmost position (on the outer side of the vehicle) (an outermost light-emitting element described in the claims) is the tenth light-emitting element LED10. The light-emitting element located in an adjacent position to the left of the tenth light-emitting element LED10 (a next outermost light-emitting element described in the claims) is a ninth light-emitting element LED9.

In the present example, the ten light-emitting elements LED1 to LED10 form an LED array, and are arrayed in the horizontal direction from left to right on one surface (front surface) of the substrate 20. The light-emitting surfaces of the ten light-emitting elements LED1 to LED10 each have a rectangular shape. The above-mentioned control device performs control for turning on or off, and increasing or decreasing the light intensity of the ten light-emitting elements LED1 to LED10. The other surface (rear surface) of the substrate 20 is attached to an attachment portion 50 of the heat sink 5.

The light (radiated light, emitted light) emitted from the light-emitting surfaces of the ten light-emitting elements LED1 to LED10 has a Lambertian shape. As a result, light from the light-emitting elements LED1 to LED10 is emitted to the front of the vehicle V in a wide range including upward, downward, left, and right.

As a result, a large part of the light from the light-emitting elements LED1 to LED10 is incident as direct light on a later-described incident surface 40 of the lens 4. Further, light from a lower part of the light-emitting elements LED1 to LED10 is reflected by a later-described reflecting surface 30 of the reflector 3 and is incident as reflected light on the incident surface 40 of the lens 4.

Further, light L1 and L2 from left parts of the first light-emitting element LED1 and the second light-emitting element LED2 are incident on a later-described inner reflecting surface 30L of the reflector 3, as illustrated in FIG. 2. Moreover, light (not illustrated) from left parts of the third light-emitting element LED3 to the tenth light-emitting element LED10 is also incident on the inner reflecting surface 30L of the reflector 3, which will be described later.

On the other hand, light L9 and L10 from right parts of the ninth light-emitting element LED9 and the tenth light-emitting element LED10 is incident on a later-described outer reflecting surface 30R of the reflector 3, as illustrated in FIG. 2. Further, light (not illustrated) from right parts of the first light-emitting element LED1 to the eighth light-emitting element LED8 is also incident on the outer reflecting surface 30R of the reflector 3, which will be described later.

(Description of Reflector 3)

The reflector 3 is arranged between the light source 2 and the lens 4. The reflector 3 includes a main body portion 31 and attachment portions 31L and 31R provided integrally on the left and right sides of the main body portion 31. The main body portion 31 is arranged below the light-emitting elements LED1 to LED10. The left attachment portion 31L is arranged to the left of the light-emitting elements LED1 to LED10. The right attachment portion 31R is arranged to the right of the light-emitting elements LED1 to LED10. The left and right attachment portions 31L and 31R are attached to the attachment portion 50 of the heat sink 5.

The reflecting surface 30 is provided on an upper surface of the main body portion 31. The reflecting surface 30 may be, for example, the reflecting surface described in JP 2017-195116 A. The reflecting surface 30 reflects the light from the lower part of the light-emitting elements LED1 to LED10 that is not incident on an effective portion of the incident surface 40 of the lens 4, onto the incident surface 40 of the lens 4, to irradiate the incident surface 40 with the light. Thus, the light from the light-emitting elements LED1 to LED10 can be utilized effectively.

(Description of Inner Reflecting Surface 30L)

The inner reflecting surface 30L is provided as a side reflector at an upper end part of the left attachment portion 31L. The inner reflecting surface 30L is provided to the left from the ten light-emitting elements LED1 to LED10. That is, the inner reflecting surface 30L is provided to the left (to the inner side of the vehicle) from the first light-emitting element LED1. The inner reflecting surface 30L is provided in front of the light-emitting elements LED1 to LED10. Further, in the present example, the inner reflecting surface 30L is formed by any surface, such as a freeform surface, a plurality of curved surfaces, one curved surface, a plurality of flat surfaces, and one flat surface.

As indicated by a solid arrow in FIG. 2, among the light from the first light-emitting element LED1, the light L1 from the left part of the first light-emitting element LED1 is incident on the inner reflecting surface 30L. As indicated by a solid arrow in FIG. 2, the inner reflecting surface 30L reflects the incident light L1 from the first light-emitting element LED1 as reflected light L11 onto the incident surface 40 of the lens 4. Among the incident surface 40 of the lens 4, the reflected light L11 is incident on an effective portion, which is left from an optical axis Z and above the optical axis Z. The reflected light L11 that is incident on the lens 4 is irradiated from the lens 4 to the front of the vehicle V in diffused light distribution patterns PL1C and PR1C described below.

As indicated by a dashed arrow in FIG. 2, among the light from the second light-emitting element LED2, the light L2 from the left part of the second light-emitting element LED2 is incident on the inner reflecting surface 30L. As indicated by a dashed arrow in FIG. 2, the inner reflecting surface 30L reflects the incident light from the second light-emitting element LED2 as reflected light L21 to an area above the optical axis Z and outside the effective portion of the incident surface 40, that is, outside a diagonally upper right side of the lens 4. Therefore, the reflected light L21 that is emitted from the second light-emitting element LED2 and reflected by the inner reflecting surface 30L is not incident on the lens 4, and thus, does not affect a left vertical cutoff line CL2L and a right vertical cutoff line CL2R of second partial light distribution patterns PL2 and PR2 described later.

Further, light from left parts of the third light-emitting element LED3 to the tenth light-emitting element LED10 is also incident on the inner reflecting surface 30L. However, the light from the third light-emitting element LED3 to the tenth light-emitting element LED10 is light from the second light-emitting element LED2 and thus, is not incident on the lens 4, similarly to the reflected light L21 reflected by the inner reflecting surface 30L. Moreover, the light from the third light-emitting element LED3 to the tenth light-emitting element LED10 is weak and thus, does not affect the left vertical cutoff line and the right vertical cutoff line of third partial light distribution patterns PL3 and PR3 to tenth partial light distribution patterns PL10 and PL10 described below. Therefore, even if the light from the third light-emitting element LED3 to the tenth light-emitting element LED10 is incident on the lens 4, the light does not affect the left vertical cutoff line and the right vertical cutoff line.

(Description of Outer Reflecting Surface 30R)

The outer reflecting surface 30R is provided as a side reflector at the upper end part of the right attachment portion 31R. The outer reflecting surface 30R is provided to the right from the ten light-emitting elements LED1 to LED10. That is, the outer reflecting surface 30R is provided to the right (the outer side of the vehicle) from the tenth light-emitting element LED10. The outer reflecting surface 30R is provided toward the front from the light-emitting elements LED1 to LED10. Further, in the present example, the outer reflecting surface 30R is formed by an ellipsoidal surface that extends in the up-down direction and in which a first focal point F1 is located at the tenth light-emitting element LED10 and a second focal point F2 is located to the left of the optical axis Z on the incident surface 40 of the lens 4.

As indicated by a solid arrow in FIG. 2, among the light from the tenth light-emitting element LED10, light L10 from the right part of the tenth light-emitting element LED10 is incident on the outer reflecting surface 30R. As indicated by a solid arrow in FIG. 2, the outer reflecting surface 30R reflects the incident light L10 from the tenth light-emitting element LED10 as reflected light L101 onto the incident surface 40 of the lens 4. Among the incident surface 40 of the lens 4, the reflected light L101 is mainly incident on an effective portion of the incident surface 40 of the lens 4, which is located left from the optical axis Z and right from the reflected light L11 from the inner reflecting surface 30L formed by the light L1 from the first light-emitting element LED1. The reflected light L101 incident on the lens 4 is emitted from the lens 4 to the front of the vehicle V as additional light distribution patterns PL10C and PR10C described below.

As indicated by a dashed arrow in FIG. 2, among the light from the ninth light-emitting element LED9, light L9 from a right part of the ninth light-emitting element LED9 is incident on the outer reflecting surface 30R. As indicated by a dashed arrow in FIG. 2, the outer reflecting surface 30R reflects the light L9 from the ninth light-emitting element LED9 as reflected light L91 to the left side to an area outside of the effective portion of the incident surface 40, that is, outward to the left side of the lens 4. Therefore, the reflected light L91 that is emitted from the ninth light-emitting element LED9 and reflected by the outer reflecting surface 30R is not incident on the lens 4, and thus, does not affect the overall high-beam light distribution pattern P.

Further, light from right parts of the first light-emitting element LED1 to the eighth light-emitting element LED8 is incident on the outer reflecting surface 30R. However, the light from the right parts of the first light-emitting element LED1 to the eighth light-emitting element LED8 is weak and thus, does not affect the overall high-beam light distribution pattern P. Therefore, the light from the first light-emitting element LED1 to the eighth light-emitting element LED8 does not affect the overall high-beam light distribution pattern P.

(Description of Lens 4)

As illustrated in FIGS. 2 and 3, in the present example, the lens 4 is a projection lens, and is formed by an aspheric lens. The lens 4 includes the incident surface 40, an emitting surface 41, and the optical axis Z. In the present example, the optical axis Z passes at a position between the sixth light-emitting element LED6 and the seventh light-emitting element LED7, as illustrated in FIG. 2.

Figure 9:
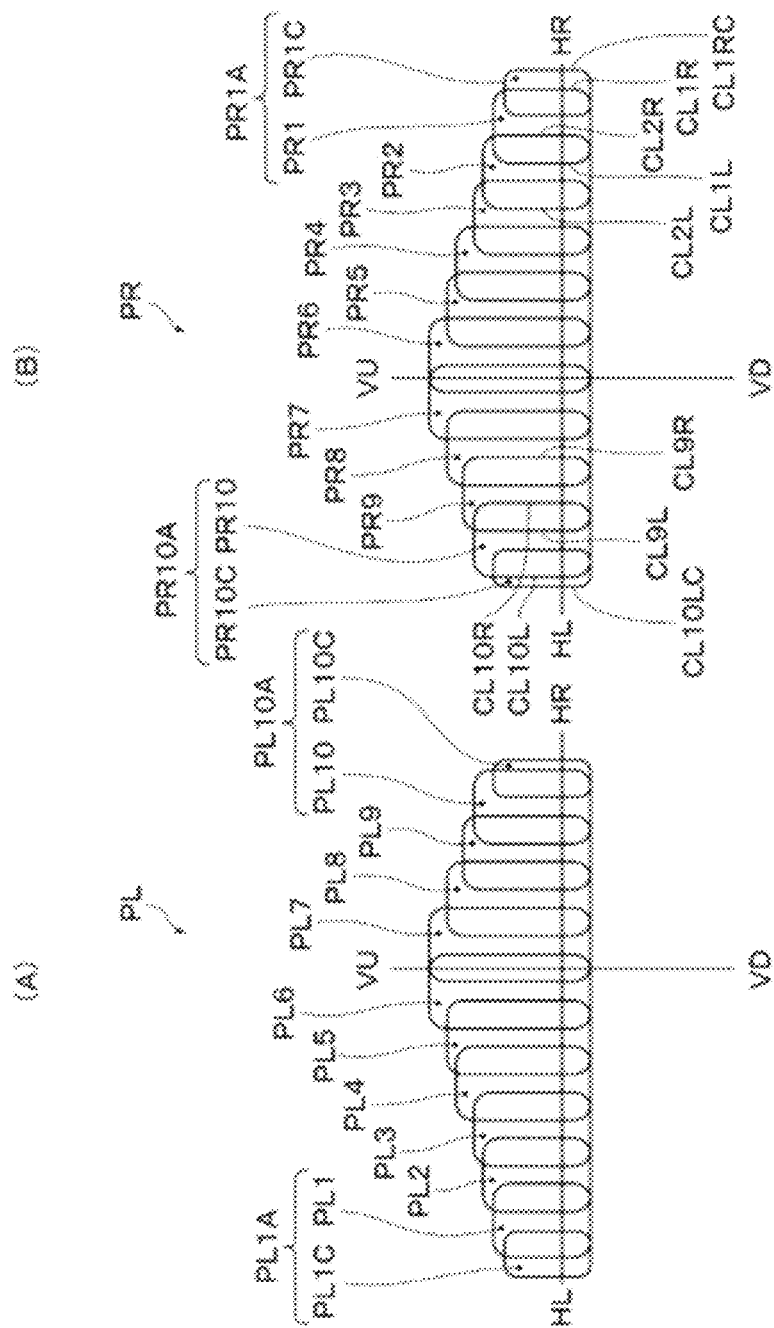
FIG. 9 is an explanatory diagram illustrating a high-beam light distribution pattern emitted from the lamp unit of the vehicular headlamp.

The lens 4 controls the light from the ten light-emitting elements LED1 to LED10 for each of the ten light-emitting elements LED1 to LED10, and emits the light to the front of the vehicle V in a plurality of partial light distribution patterns, in the example, ten partial light distribution patterns PL1 to PL10 and PR1 to PR10 (see FIG. 9). Here, in the present example, the light from the ten light-emitting elements LED1 to LED10 includes direct light from the ten light-emitting elements LED1 to LED10 and reflected light that is light from the ten light-emitting elements LED1 to LED10 which is reflected by the reflecting surface 30. The ten partial light distribution patterns PL1 to PL10 and PR1 to PR10 will be described in detail later.

The lens 4 controls the light L1 from the first light-emitting element LED1, that is, the reflected light L11 from the inner reflecting surface 30L, and emits the reflected light L11 toward the front of the vehicle V as emitted light L12 (see the solid arrow in FIG. 2), that is, as diffused light distribution patterns PL1C and PR1C (see FIGS. 5C and 9). The diffused light distribution patterns PL1C and PR1C will be described in detail later, similarly to the ten partial light distribution patterns. The light L2 from the second light-emitting element LED2, that is, the reflected light L21 from the inner reflecting surface 30L passes outside the lens 4 and thus, does not form a light distribution pattern as illustrated in FIG. 6C.

Further, the lens 4 controls the light L10 from the tenth light-emitting element LED10, that is, the reflected light L101 from the outer reflecting surface 30R, and emits the reflected light L101 toward the front of the vehicle V as emitted light L102 (see the dashed arrow in FIG. 2), that is, as the additional light distribution patterns PL10C and PR10C (see FIGS. 7C and 9). The additional light distribution patterns PL10C and PR10C will be described in detail later, similarly to the ten partial light distribution patterns and the diffused light distribution patterns PL1C and PR1C. The light L9 from the ninth light-emitting element LED9, that is, the reflected light L91 from the outer reflecting surface 30R passes outside the lens 4 and thus, does not form a light distribution pattern as illustrated in FIG. 8C.

The incident surface 40 is an aspheric surface, in the present example, an aspheric surface close to a plane, and controls the light from each of the ten light-emitting elements LED1 to LED10 within the lens 4 as incident light (not illustrated). The emitting surface 41 is an aspheric surface, in the present example, an aspheric surface close to a sphere, and controls the incident light from each of the ten light-emitting elements LED1 to LED10 that is incident on the incident surface 40, to be emitted as emitted light (not illustrated) to the outside, that is, toward the front of the vehicle V.

As described above, the incident surface 40 and the emitting surface 41 of the lens 4 are designed and formed, based on the light distribution of the ten partial light distribution patterns PL1 to PL10 and PR1 to PR10, the diffused light distribution pattern PR1C, and the additional light distribution pattern PR10C, which will be described below.

The front shape of the lens 4 (the front shape of the emitting surface 41) is a horizontally elongated shape that has a narrow vertical width (up-down width) and a wide horizontal width (left-right width). The thickness of the lens 4 is thicker at a center part and decreases gradually from the center part to a peripheral part. Further, the radius of curvature of the incident surface 40 is greater than the radius of curvature of the emitting surface 41. That is, the lens 4 of the lamp units 1L and 1R of ADB type needs to cause light from the ten light-emitting elements LED1 to LED10 to be incident on the incident surface 40 and emitted toward the front of the vehicle V from the emitting surface 41. Therefore, the radius of curvature of the incident surface 40 is large, and the radius of curvature of the emitting surface 41 is small.

(Description of Light Distribution Patterns)

The light distribution patterns emitted from the left and right lamp units 1L and 1R will be described below with reference to FIGS. 5 to 12.

As illustrated in FIG. 9A, the left lamp unit 1L of the left vehicular headlamp 100L emits the ten partial light distribution patterns PL1 to PL10 (PL1, PL2, PL3, PL4, PL5, PL6, PL7, PL8, PL9, and PL10), the diffused light distribution pattern PL1C, and the additional light distribution pattern PL10C as the left high-beam light distribution pattern PL toward the front of the vehicle V. Here, the ten partial light distribution patterns PL1 to PL10 are referred to as the first partial light distribution pattern PL1 to the tenth partial light distribution pattern PL10, starting from the left side.

On the other hand, as illustrated in FIGS. 5 to 8 and 9B, the right lamp unit 1R of the right vehicular headlamp 100R emits the ten partial light distribution patterns PR1 to PR10 (PR1, PR2, PR3, PR4, PR5, PR6, PR7, PR8, PR9, and PR10), the diffused light distribution pattern PR1C, and the additional light distribution pattern PR10C as the right high-beam light distribution pattern PR toward the front of the vehicle V. Here, the ten partial light distribution patterns PR1 to PR10 are referred to as the first partial light distribution pattern PR1 to the tenth partial light distribution pattern PR10, starting from the right side.

Figure 11:
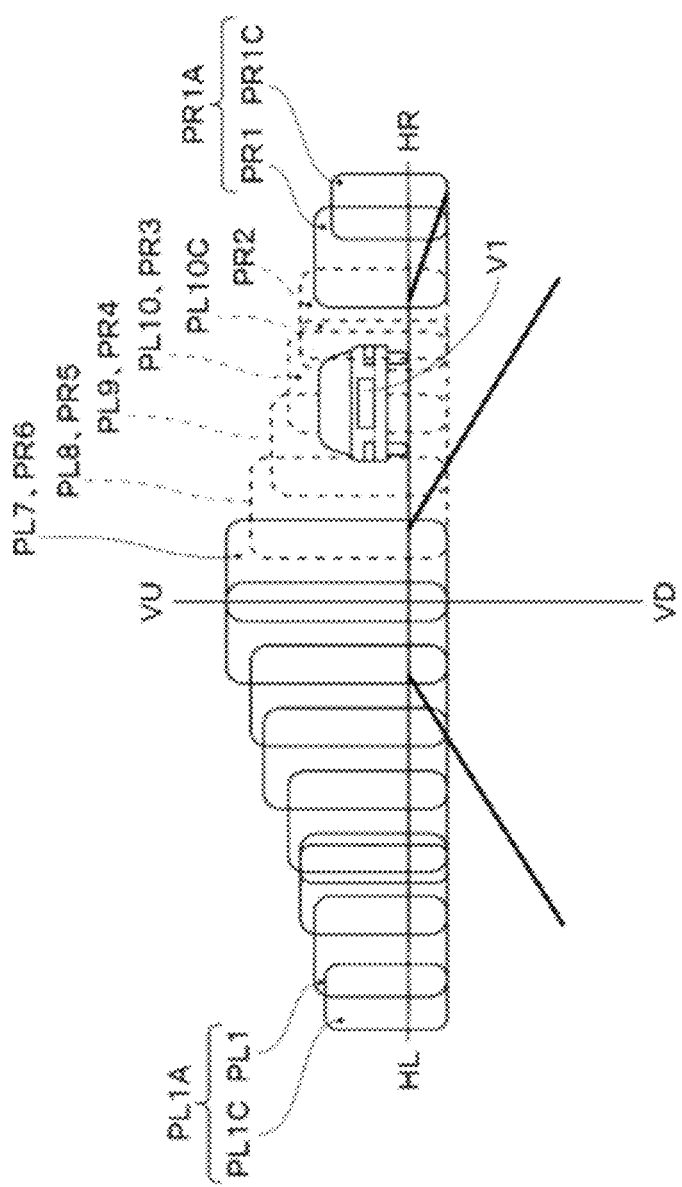
FIG. 11 is an explanatory diagram illustrating an overall high-beam light distribution pattern when an oncoming vehicle is present.
Figure 12:
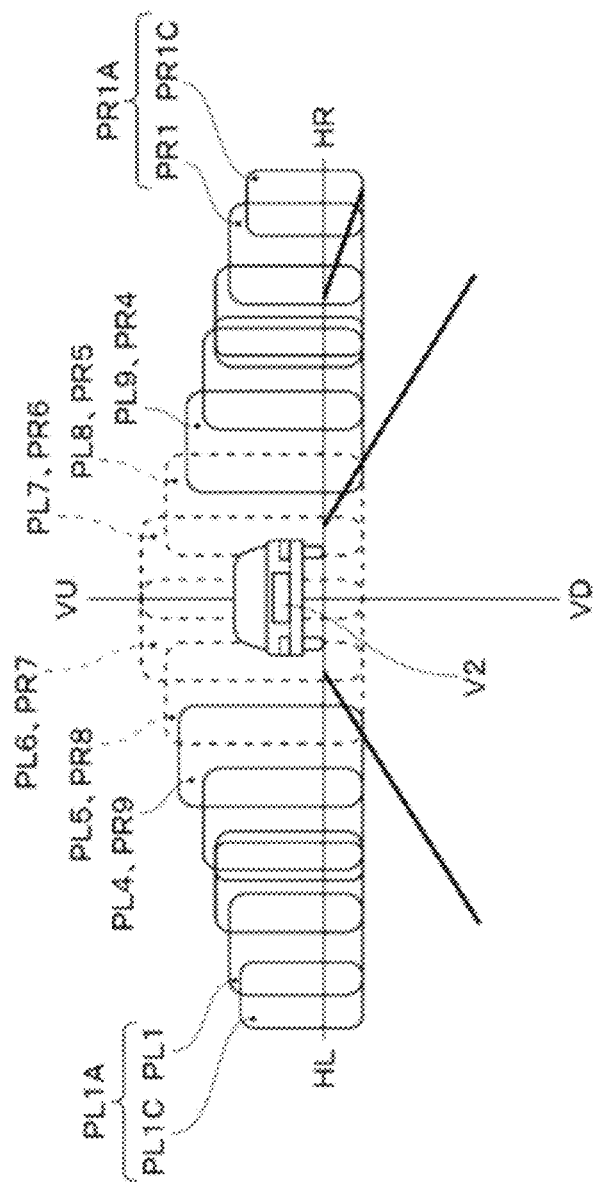
FIG. 12 is an explanatory diagram illustrating an overall high-beam light distribution pattern when a preceding vehicle is present.

The left high-beam light distribution pattern PL and the right high-beam light distribution pattern PR emitted from the left and right lamp units 1L and 1R are superimposed to form the overall high-beam light distribution pattern P, as illustrated in FIGS. 10 to 12. In the overall high-beam light distribution pattern P, the left part of the left high-beam light distribution pattern PL is diffused further left than the left part of the right high-beam light distribution pattern PR, and the right part of the right high-beam light distribution pattern PR is diffused further right than the right part of the left high-beam light distribution pattern PL.

Note that the shapes of the ten partial light distribution patterns PL1 to PL10 and PR1 to PR10, the shapes of the diffused light distribution patterns PL1C and PR1C, and the shapes of the additional light distribution patterns PL10C and PR10C are not limited to the shapes illustrated in FIGS. 5 to 12.

(Description of Ten Partial Light Distribution Patterns PL1 to PL10 and PR1 to PR10)

As described above, the ten partial light distribution patterns PL1 to PL10 and PR1 to PR10 are formed by using the lens 4 to control the light from the ten light-emitting elements LED1 to LED10 (direct light from the ten light-emitting elements LED1 to LED10 and light from the ten light-emitting elements LED1 to LED10).

That is, the ten partial light distribution patterns PL1 to PL10 and PR1 to PR10 are formed from projected images of the light-emitting surfaces of the ten light-emitting elements LED1 to LED10 illuminated by the lens 4, and correspond one-to-one to corresponding ones of the ten light-emitting elements LED1 to LED10. The ten partial light distribution patterns PL1 to PL10 and PR1 to PR10 are arrayed in the horizontal direction from left to right.

The control for turning on or off, and increasing or decreasing the light intensity of the ten partial light distribution patterns PL1 to PL10 and PR1 to PR10 is performed based on the control for turning on or off, and increasing or decreasing the light intensity of each of the ten light-emitting elements LED1 to LED10 performed by the control device. Thus, the ten partial light distribution patterns PL1 to PL10 and PR1 to PR10 have high resolution in the overall high-beam light distribution pattern P.

(Description of Vertical Cutoff Line)

The left vertical cutoff line and the right vertical cutoff line are respectively formed at the left end and the right end of the ten partial light distribution patterns PL1 to PL10 and PR1 to PR10. For example, as illustrated in FIGS. 5B and 9B, a left vertical cutoff line CL1L and a right vertical cutoff line CL1R are formed on the left and right ends of the first partial light distribution pattern PR1 on the right side. As illustrated in FIGS. 6A, 6B, and 9B, a left vertical cutoff line CL2L and a right vertical cutoff line CL2R are formed on the left and right ends of the second partial light distribution pattern PR2 on the right side. Further, as illustrated in FIGS. 7B and 9B, a left vertical cutoff line CL10L and a right vertical cutoff line CL10R are formed on the left and right ends of the tenth partial light distribution pattern PR10 on the right side. Moreover, as illustrated in FIGS. 8A, 8B, and 9B, a left vertical cutoff line CL9L and a right vertical cutoff line CL9R are formed on the left and right ends of the ninth partial light distribution pattern PR9 on the right side.

The left vertical cutoff lines and the right vertical cutoff lines are provided to prevent an adjacent bright area (the partial light distribution patterns PL7, PR6, and PR1 illustrated by solid lines in FIG. 11, and the partial light distribution patterns PL4, PR8, PL9, and PR4 illustrated by solid lines in FIG. 12) from glaring onto a preceding vehicle when an area where the vehicle in front is present (the partial light distribution patterns PL8 to PL10, PR2 to PR5, and PL10C illustrated by dashed lines in FIG. 11, and the partial light distribution patterns PL5 to PL8 and PR5 to PR8 illustrated by dashed lines in FIG. 12) is darker than the surrounding area (the partial light distribution patterns illustrated by solid lines in FIGS. 11 and 12). Thus, the left vertical cutoff lines and the right vertical cutoff lines of the ten partial light distribution patterns PL1 to PL10 and PR1 to PR10 are formed with high precision and controlled with high precision by the lens 4.

(Description of Diffused Light Distribution Patterns PL1C and PR1C)

As illustrated in FIGS. 5 and 9 to 12, the diffused light distribution patterns PL1C and PR1C are formed by using the lens 4 to control the light L1 from the first light-emitting element LED1, that is, the reflected light L11 reflected by the inner reflecting surface 30L. The diffused light distribution patterns PL1C and PR1C are superimposed on the first partial light distribution patterns PL1 and PR1 on the outer side of the vehicle among the ten partial light distribution patterns PL1 to PL10 and PR1 to PR10.

An edge of the diffused light distribution patterns PL1C and PR1C on the outer side of the vehicle, in the present example, a vertical cutoff line CL1RC on the outer side of the vehicle (see FIGS. 5C and 9B), is located further to the outer side (the right side) of the vehicle than an edge of the first partial light distribution patterns PL1 and PR1 on the outer side of the vehicle, in the present example, the vertical cutoff line CL1R on the outer side of the vehicle (see FIGS. 5C and 9B).

Thus, an edge on the outer side of the vehicle of the first partial light distribution patterns PL1A and PR1A onto which the diffused light distribution patterns PL1C and PR1C are superimposed (hereinafter, referred to as "superimposed first partial light distribution patterns PL1A and PR1A"), in the present example, the vertical cutoff line CL1RC on the outer side of the vehicle (see FIGS. 5A and 9B), is located further to the outer side (the right side) of the vehicle than an edge on the outer side of the vehicle of the first partial light distribution patterns PL1 and PR1 onto which the diffused light distribution patterns PL1C and PR1C are not superimposed (hereinafter, referred to as "first partial light distribution patterns PL1 and PR1 before superposition"), in the present example, the vertical cutoff line CL1R on the outer side of the vehicle (see FIGS. 5B and 9B).

Therefore, a portion of the superimposed first partial light distribution patterns PL1A and PR1A on the outer side of the vehicle (see FIGS. 5A and 9B) is diffused further outward from the vehicle than a portion of the first partial light distribution patterns PL1 and PR1 before superposition on the outer side of the vehicle (see FIGS. 5B and 9B).

The area of the diffused light distribution patterns PL1C and PR1C is narrower than the area of the first partial light distribution patterns PL1A and PR1A. Thus, an edge of the diffused light distribution patterns PL1C and PR1C on the inner side of the vehicle (see FIGS. 5C and 9B), is located further to the outer side (the right side) of the vehicle than an edge of the first partial light distribution patterns PL1 and PR1 on the inner side of the vehicle, in the present example, the vertical cutoff line CL1L on the inner side of the vehicle (see FIGS. 5B and 9B).

Therefore, the vertical cutoff line CL1L on the inner side of the vehicle of the superimposed first partial light distribution patterns PL1A and PR1A (see FIGS. 5A and 9B) and the vertical cutoff line CL1L on the inner side of the vehicle of the first partial light distribution patterns PL1 and PR1 before superposition (see FIGS. 5B and 9B) are identical or substantially identical.

(Description of Additional Light Distribution Patterns PL10C and PR10C)

As illustrated in FIGS. 7 and 9 to 12, the additional light distribution patterns PL10C and PR10C are formed by using the lens 4 to control the light L10 from the tenth light-emitting element LED10, that is, the reflected light L101 reflected by the outer reflecting surface 30R.

The additional light distribution patterns PL10C and PR10C are superimposed on the inner side of the vehicle of the tenth partial light distribution patterns PL10 and PR10. That is, the additional light distribution pattern PL10C on the left side is superimposed on the right side, that is, the inner side of the vehicle of the tenth partial light distribution pattern PL10 on the left side, as illustrated in FIG. 9A, and the additional light distribution pattern PR10C on the right side is superimposed on the left side, that is, the inner side of the vehicle, of the tenth partial light distribution pattern PR10 on the right side, as illustrated in FIG. 9B.

Therefore, the luminous intensity of tenth partial light distribution patterns PL10A and PR10A onto which the additional light distribution patterns PL10C and PR10C are superimposed (hereinafter, referred to as "superimposed tenth partial light distribution patterns PL10A and PR10A", see FIG. 7A) is higher than the luminous intensity of the tenth partial light distribution patterns PL10 and PR10 onto which the additional light distribution patterns PL10C and PR10C are not superimposed (hereinafter, referred to as "tenth partial light distribution patterns PL10 and PR10 before superposition", see FIG. 7B).

Further, a vertical cutoff line CL10LC on the inner side of the vehicle of the additional light distribution patterns PL10C and PR10C (see FIGS. 7C and 9B) is located slightly more to the inner side of the vehicle than the vertical cutoff line CL10L on the inner side of the vehicle of the tenth partial light distribution patterns PL10 and PR10 (see FIGS. 7B and 9B). Thus, a portion of the additional light distribution patterns PL10C and PR10C on the inner side of the vehicle is located slightly more to the inner side of the vehicle than a portion of the tenth partial light distribution patterns PL10 and PR10 on the inner side of the vehicle. Therefore, a portion of the superimposed tenth partial light distribution patterns PL10A and PR10A on the inner side of the vehicle (see FIGS. 7A and 9B) is slightly more diffused toward the inner side of the vehicle than a portion of the tenth partial light distribution patterns PL10 and PR10 before superposition on the inner side of the vehicle (see FIGS. 7B and 9B).

The diffusion width of the part of the superimposed tenth partial light distribution patterns PL10A and PR10A on the inner side of the vehicle is narrower than the diffusion width of the part of the superimposed first partial light distribution patterns PL1A and PR1A on the outer side of the vehicle. Further, the vertical cutoff line CL1OR on the outer side of the vehicle of the superimposed tenth partial light distribution patterns PL10A and PR10A and the vertical cutoff line CL1OR on the outer side of the vehicle of the tenth partial light distribution patterns PL10 and PR10 before superposition are identical or substantially identical.

(Description of Heat Sink 5)

The heat sink 5 is formed of a member having high thermal conductivity, in the present example, a member formed from aluminum by die-casting. As illustrated in FIGS. 2 to 4, the heat sink 5 is formed by an integral structure including the attachment portion 50 having a plate shape and a heat dissipating portion 51 having a shape including fins.

The light-emitting elements LED1 to LED10 are attached via the substrate 20 to an attachment surface on the front surface of the attachment portion 50, and the attachment portions 31L and 31R of the reflector 3 are also attached to the attachment portion 50. The front surface of the heat dissipating portion 51 is integrally provided on the rear surface of the attachment portion 50. The plurality of fins of the heat dissipating portion 51 are parallel or substantially parallel in the up-down direction.

(Description of Fan Unit 6)

As illustrated in FIGS. 2 to 4, the fan unit 6 is attached to the rear surface of the heat dissipating portion 51 of the heat sink 5. The fan unit 6 forcibly and directly blows air onto the heat sink 5, and thus, cools the heat sink 5 from the heat generated in the light-emitting elements LED1 to LED10.

Description of Operation of Embodiment

The lamp units 1L and 1R according to the present embodiment and the vehicular headlamps 100L and 100R according to the present embodiment are configured as described above, and an operation of the lamp units 1L and 1R and the vehicular headlamps 100L and 100R will be described below.

(Description of Case without Vehicle in Front Such as Oncoming Vehicle V1 and Preceding Vehicle V2)

As illustrated in FIG. 10, when there is no vehicle in front such as the oncoming vehicle V1 and the preceding vehicle V2, the detection portion of the control device does not detect a vehicle in front such as the oncoming vehicle V1 and the preceding vehicle V2. Thus, all of the ten left and right light-emitting elements LED1 to LED10 of the left and right lamp units 1L and 1R light up.

Subsequently, light from each of the ten light-emitting elements LED1 to LED10 of the left and right lamp units 1L and 1R is incident on the incident surface 40 of the lens 4 as direct light or as reflected light from the reflecting surface 30. The light from each of the ten light-emitting elements LED1 to LED10 that is incident on the lens 4 passes through the emitting surface 41 of the lens 4 and is emitted toward the front of the vehicle V as the ten left and right partial light distribution patterns PL1 to PL10 and PR1 to PR10, as illustrated in FIGS. 9 to 12.

Further, a part of the light L1 from the first light-emitting element LED1 is reflected by the outer reflecting surface 30R, and the reflected light L11 passes through the lens 4 and is emitted. Subsequently, the emitted light L12 is emitted toward the front of the vehicle V as the left and right diffused light distribution patterns PL1C and PR1C, as illustrated in FIGS. 5 and 9 to 12.

Moreover, a part of the light L10 from the tenth light-emitting element LED10 is reflected by the inner reflecting surface 30L, and the reflected light L101 passes through the lens 4 and is emitted. Subsequently, the emitted light L102 is emitted toward the front of the vehicle V as the left and right additional light distribution patterns PL10C and PR10C, as illustrated in FIGS. 7 and 9 to 12.

The ten left and right partial light distribution patterns PL1 to PL10 and PR1 to PR10, the left and right diffused light distribution patterns PL1C and PR1C, and the left and right additional light distribution patterns PL10C and PR10C are superimposed to form the left and right high-beam light distribution patterns PL and PR illustrated in FIGS. 9 to 12. The left and right high-beam light distribution patterns PL and PR are superimposed on each other to form the overall high-beam light distribution pattern P illustrated in FIGS. 10 to 12.

(Description of Case where Oncoming Vehicle V1 is Present)

As illustrated in FIG. 11, when the oncoming vehicle V1 is present, the detection portion of the control device detects the oncoming vehicle V1. Therefore, among the ten light-emitting elements LED1 to LED10 in the left and right lamp units 1L and 1R, the light-emitting elements that illuminate the area where the oncoming vehicle V1 is present, in the present example, the light-emitting elements LED8 to LED10 of the left lamp unit 1L and the light-emitting elements LED2 to LED5 of the right lamp unit 1R, are turned off or decreased in light intensity by the control of the control device.

Subsequently, among the ten left and right partial light distribution patterns PL1 to PL10 and PR1 to PR10, the left and right diffused light distribution patterns PL1C and PR1C, and the left and right additional light distribution patterns PL10C and PR10C, the left partial light distribution patterns PL8 to PL10 and PL10C and the right partial light distribution patterns PR2 to PR5 respectively corresponding to the light-emitting elements LED8 to LED10 of the turned-off left lamp unit 1L and the light-emitting elements LED2 to LED5 of the turned-off right lamp unit 1R are turned off or decreased in light intensity, as illustrated by the dashed lines in FIG. 11. As a result, in the overall high-beam light distribution pattern P illustrated in FIG. 11, the area where the oncoming vehicle V1 is present is darker than surrounding areas thereof, and no dazzling light is emitted toward the oncoming vehicle V1.

(Description of Case where Preceding Vehicle V2 is Present)

As illustrated in FIG. 12, when the preceding vehicle V2 is present, the detection portion of the control device detects the preceding vehicle V2. Therefore, among the ten light-emitting elements LED1 to LED10 in the left and right lamp units 1L and 1R, the light-emitting elements that illuminate the area where the preceding vehicle V2 is present, in the present example, the light-emitting elements LED5 to LED8 of the left lamp unit 1L and the light-emitting elements LED5 to LED8 of the right lamp unit 1R, are turned off or decreased in light intensity by the control of the control device.

Subsequently, among the ten left and right partial light distribution patterns PL1 to PL10 and PR1 to PR10, the left and right diffused light distribution patterns PL1C and PR1C, and the left and right additional light distribution patterns PL10C and PR10C, the left partial light distribution patterns PL5 to PL8 and the right partial light distribution patterns PR5 to PR8 respectively corresponding to the light-emitting elements LED5 to LED8 of the turned-off left lamp unit 1L and the light-emitting elements LED5 to LED8 of the turned-off right lamp unit 1R, are turned off or decreased in light intensity, as illustrated by the dashed lines in FIG. 12. As a result, in the overall high-beam light distribution pattern P illustrated in FIG. 12, the area where the preceding vehicle V2 is present is darker than surrounding areas thereof, and no dazzling light is emitted toward the preceding vehicle V2.

(Description of Cooling)

Heat generated in the light-emitting elements LED1 to LED10 is dissipated to the outside via the substrate 20 and the heat sink 5 that serves as an attachment member. The heat sink 5 is cooled by the fan unit 6 by using forced air cooling.

(Description of Effects of Embodiment)

The lamp units 1L and 1R according to the present embodiment and the vehicular headlamps 100L and 100R according to the present embodiment (hereinafter, referred to as "lamp systems 1L, 1R, 100L, and 100R") have the above-described configuration and operation, and the effects thereof will be described below.

In the lamp systems 1L, 1R, 100L, and 100R, the light L1 from the first light-emitting element LED1, which is located furthest to the inner side of the vehicle among the ten light-emitting elements LED1 to LED10, is reflected onto the lens 4 as the reflected light L11 by the inner reflecting surface 30L, which is located further to the inner side of the vehicle than the ten light-emitting elements LED1 to LED10.

Further, the lamp systems 1L, 1R, 100L, and 100R use the lens 4 arranged in front of the light source 2 including the ten light-emitting elements LED1 to LED10 to emit the light from the ten light-emitting elements LED1 to LED10 toward the front of the vehicle V as the ten partial light distribution patterns PL1 to PL10 and PR1 to PR10 arrayed in the horizontal direction from left to right.

Moreover, the lamp systems 1L, 1R, 100L, and 100R use the lens 4 to emit the reflected light L11 from the inner reflecting surface 30L toward the front of the vehicle V as the diffused light distribution patterns PL1C and PR1C, so that the diffused light distribution patterns PL1C and PR1C are superimposed on the first partial light distribution patterns PL1 and PR1 which are located furthest on the outer side of the vehicle among the ten partial light distribution patterns PL1 to PL10 and PR1 to PR10, and so that an edge of the diffused light distribution patterns PL1C and PR1C on the outer side of the vehicle (the vertical cutoff line CL1RC on the outer side of the vehicle) is located further on the outer side of the vehicle than an edge of the first partial light distribution patterns PL1 and PR1 on the outer side of the vehicle (the vertical cutoff line CL1R on the outer side of the vehicle).

Thus, in the lamp systems 1L, 1R, 100L, and 100R, the edge of the superimposed first partial light distribution patterns PL1A and PR1A (the first partial light distribution patterns PL1A and PR1A onto which the diffused light distribution patterns PL1C and PR1C are superimposed) on the outer side of the vehicle (the vertical cutoff line CL1RC on the outer side of the vehicle), can be positioned further to the outer side of the vehicle than the edge of the first partial light distribution patterns PL1 and PR1 before superposition (the first partial light distribution patterns PL1 and PR1 onto which the diffused light distribution patterns PL1C and PR1C are not superimposed) on the outer side of the vehicle (the vertical cutoff line CL1R on the outer side of the vehicle).

Therefore, the lamp systems 1L, 1R, 100L, and 100R can diffuse a portion of the superimposed first partial light distribution patterns PL1A and PR1A on the outer side of the vehicle further to an outer side of the vehicle than a portion on the outer side of the vehicle of the first partial light distribution patterns PL1 and PR1 before superposition.

As described above, the lamp systems 1L, 1R, 100L, and 100R can diffuse the left and right sides of the overall high-beam light distribution pattern P on the outer side of the vehicle further to the left and right sides on the outer side of the vehicle, and thus, the visibility is improved.

In the lamp systems 1L, 1R, 100L, and 100R, the area of the diffused light distribution patterns PL1C and PR1C is narrower than the area of the first partial light distribution patterns PL1A and PR1A, and thus, the edge of the diffused light distribution patterns PL1C and PR1C on the inner side of the vehicle (see FIG. 5C) can be positioned further on the outer side of the vehicle than the edge of the first partial light distribution patterns PL1 and PR1 on the inner side of the vehicle (the vertical cutoff line CL1L on the inner side of the vehicle, see FIG. 5B).

Therefore, in the lamp systems 1L, 1R, 100L, and 100R, it is possible to align the vertical cutoff line CL1L on the inner side of the vehicle (see FIG. 5A) of the superimposed first partial light distribution patterns PL1A and PR1A to be identical or substantially identical to the vertical cutoff line CL1L on the inner side of the vehicle of the first partial light distribution patterns PL1 and PR1 before superposition.

Thus, in the lamp systems 1L, 1R, 100L, and 100R, when the second partial light distribution patterns PL2 and PR2 located to the inner side of the vehicle from the superimposed first partial light distribution patterns PL1A and PR1A are turned off or decreased in light intensity, the vertical cutoff line CL1L on the inner side of the vehicle of the superimposed first partial light distribution patterns PL1A and PR1A that appear is identical to the vertical cutoff line CL1L on the inner side of the vehicle of the first partial light distribution patterns PL1 and PR1 before superposition, and thus, do not affect the vertical cutoff line CL1L on the inner side of the vehicle. That is, the light distribution of the portion of the superimposed first partial light distribution patterns PL1A and PR1A on the inner side of the vehicle affects the light distribution on the inner side of the vehicle less than the superimposed first partial light distribution patterns PL1A and PR1A.

As a result, the lamp systems 1L, 1R, 100L, and 100R do not glare onto a vehicle in front present in the area of the second partial light distribution patterns PL2 and PR2. Here, a vehicle in front is in general more likely to be present in an area on an inner side of the vehicle in the overall high-beam light distribution pattern P than in an area on the outer side of the vehicle. Therefore, among the overall high-beam light distribution pattern P, a partial light distribution pattern in the area on the inner side of the vehicle is turned off or decreased in light intensity more frequently than a partial light distribution pattern in the area on the outer side of the vehicle. As a result, the lamp systems 1L, 1R, 100L, and 100R are suitable for the overall high-beam light distribution pattern P described above.

In the lamp systems 1L, 1R, 100L, and 100R, the light L2 from the second light-emitting element LED2 located adjacent to the first light-emitting element LED1 is reflected by the inner reflecting surface 30L as the reflected light L21 onto an area other than the lens 4. Therefore, in the lamp systems 1L, 1R, 100L, and 100R, the reflected light L21 from the inner reflecting surface 30L does not pass through the lens 4 to form a light distribution pattern, and thus, the reflected light L21 from the inner reflecting surface 30L does not affect the ten partial light distribution patterns PL1 to PL10 and PR1 to PR10.

As a result, in the lamp systems 1L, 1R, 100L, and 100R, when the first partial light distribution patterns PL1A and PR1A, which are located furthest to the outer side of the vehicle, are turned off or decreased in light intensity, the second partial light distribution patterns PL2 and PR2 adjacent to the first partial light distribution patterns PL1A and PR1A are not diffused to the outer side of the vehicle, and do not glare onto a vehicle in front that is present in the area of the first partial light distribution patterns PL1A and PR1A.

In the lamp systems 1L, 1R, 100L, and 100R, the inner reflecting surface 30L is formed of any surface and reflects the light L1 from the first light-emitting element LED1 onto an effective portion of the lens 4 that is further on the inner side of the vehicle than the optical axis Z and above the optical axis Z, and reflects the light L2 from the second light-emitting element LED2 onto an area above the optical axis Z other than the effective portion of the lens 4.

As a result, in the lamp systems 1L, 1R, 100L, and 100R, the inner reflecting surface 30L can form the light L1 from the first light-emitting element LED1 into the diffused light distribution patterns PL1C and PR1C with high precision, and it is possible to perform control with high precision. Moreover, in the lamp systems 1L, 1R, 100L, and 100R, it is possible to control the light L2 from the second light-emitting element LED2 with high precision, and thus, suppress an influence on the ten partial light distribution patterns PL1 to PL10 and PR1 to PR10.

In the lamp systems 1L, 1R, 100L, and 100R, the outer reflecting surface 30R, which is provided further on the outer side of the vehicle than the ten light-emitting elements LED1 to LED10, reflects the light L10 from the tenth light-emitting element LED10, which is located furthest on the outer side of the vehicle, onto the lens 4 as the reflected light L101. Further, in the lamp systems 1L, 1R, 100L, and 100R, the lens 4 emits the reflected light L101 from the outer reflecting surface 30R toward the front of the vehicle V as the additional light distribution patterns PL10C and PR10C, to add the reflected light L101 to the tenth partial light distribution patterns PL10 and PR10, which are located furthest to the inner side of the vehicle.

As a result, in the lamp systems 1L, 1R, 100L, and 100R, by using the tenth partial light distribution patterns PL10A and PR10A on which the additional light distribution patterns PL10C and PR10C are superimposed, it is possible to increase the luminous intensity of an area of the overall high-beam light distribution pattern P onto which the additional light distribution patterns PL10C and PR10C are superimposed.

In the lamp systems 1L, 1R, 100L, and 100R, the outer reflecting surface 30R is formed from an ellipsoidal surface in which the first focal point F1 is located on the tenth light-emitting element LED10 and the second focal point F2 is located on the incident surface 40 of the lens 4.

As a result, in the lamp systems 1L, 1R, 100L, and 100R, the outer reflecting surface 30R can reflect the light L10 from the tenth light-emitting element LED10 with high precision onto an effective portion of the lens 4 further on the outer side of the vehicle than the light L1 from the first light-emitting element, that is, the reflected light L11 from the inner reflecting surface 30L, and can form the light L10 into the additional light distribution patterns PL10C and PR10C with high precision and perform control with high precision.

The lamp systems 1L, 1R, 100L, and 100R include the reflector 3 arranged between the light source 2 and the lens 4, use the reflecting surface 30 of the reflector 3 to reflect the light from the ten light-emitting elements LED1 to LED10 onto the lens 4, and use the lens 4 to superimpose the light from the ten light-emitting elements LED1 to LED10 and the light from the reflecting surface 30, to emit the obtained light as the ten partial light distribution patterns PL1 to PL10 and PR1 to PR10 toward the front of the vehicle V.

As a result, the lamp systems 1L, 1R, 100L, and 100R can effectively utilize the light from the ten light-emitting elements LED1 to LED10, and thus, it is possible to increase the luminous intensity of the overall high-beam light distribution pattern P.

In the lamp systems 1L, 1R, 100L, and 100R, the inner reflecting surface 30L and the outer reflecting surface 30R are provided on the reflector 3, and thus, it is possible to reduce the number of the components.

Further, in the lamp systems 1L, 1R, 100L, and 100R, it is possible to maintain the positions of the reflecting surface 30, the inner reflecting surface 30L, and the outer reflecting surface 30R relative to each other with high precision via the reflector 3, and thus, it is possible to maintain the positions of the ten partial light distribution patterns PL1 to PL10 and PR1 to PR10, the diffused light distribution patterns PL1C and PR1C, and the additional light distribution patterns PL10C and PR10C relative to each other with high precision, which is preferable for the overall high-beam light distribution pattern P.

(Description of Examples Other than Embodiment)

In the above-described embodiment, ten partial light distribution patterns are formed by the ten light-emitting elements LED1 to LED10. However, in the present invention, four partial light distribution patterns may be formed by at least four light-emitting elements LED1, LED2, LED9, and LED10. That is, it is preferable to form a high-beam light distribution pattern by using 10 to 14 light-emitting elements to form 10 to 14 partial light distribution patterns.

In the above-described embodiment, an example in which the lamp units 1L and 1R emitting a high-beam light distribution pattern are arranged in the lamp chamber 103 is described. However, in the present invention, in addition to the lamp units 1L and 1R emitting a high-beam light distribution pattern, for example, a lamp unit emitting a low-beam light distribution pattern or a daytime running lamp may be arranged in the lamp chamber 103.

The present invention is not limited to the above-described embodiments.

DESCRIPTION OF REFERENCE NUMERALS

1L Left lamp unit (lamp unit)
1R Right lamp unit (lamp unit)
2 Light source
20 Substrate
3 Reflector
30 Reflecting surface
30L Inner reflecting surface
30R Outer reflecting surface
31 Main body portion
31L Left attachment portion
31R Right attachment portion
4 Lens
40 Incident surface
41 Emitting surface
5 Heat sink
50 Attachment portion
51 Heat dissipating portion
6 Fan unit
100L Left vehicular headlamp (vehicular headlamp)
100R Right vehicular headlamp (vehicular headlamp)
101 Lamp housing
102 Lamp lens
103 Lamp chamber
B Rear
CL1L Cutoff line
CL1R Cutoff line
CL1RC Cutoff line
CL2L Cutoff line
CL2R Cutoff line
CL9L Cutoff line
CL9R Cutoff line
CL10L Cutoff line
CL10L Cutoff line
CL10LC Cutoff line
D Down
F Front
F1 First focal point
F2 Second focal point
HL-HR Horizontal line from left to right in screen
L Left
L1 Light
L11 Reflected light
L12 Emitted light
L2 Light
L21 Reflected light
L9 Light
L91 Reflected light
L10 Light
L101 Reflected light
L102 Emitted light
LED1, LED2, LED3, LED4, LED5, LED6, LED7, LED8, LED9, LED10 (LED1 to LED10) Ten light-emitting elements
P Overall high-beam light distribution pattern
PL Left high-beam light distribution pattern
PR Right high-beam light distribution pattern
PL1, PL2, PL3, PL4, PL5, PL6, PL7, PL8, PL9, PL10 (PL1 to PL10) Ten partial light distribution patterns on left side
PL1A Superimposed first partial light distribution pattern on left side
PL1C Diffused light distribution pattern on left side
PL10A Superimposed tenth partial light distribution pattern on left side
PL10C Additional light distribution pattern on left side
PR1, PR2, PR3, PR4, PR5, PR6, PR7, PR8, PR9, PR10 (PR1 to PR10) Ten partial light distribution patterns on right side
PR1A Superimposed first partial light distribution pattern on right side
PR1C Diffused light distribution pattern on right side
PR10A Superimposed tenth partial light distribution pattern on right side
PR10C Additional light distribution pattern on right side
R Right
U Up
V Vehicle (host vehicle)
V1 Oncoming vehicle
V2 Preceding vehicle
VU-VD Vertical line from top to bottom in screen
Z Optical axis

The invention claimed is:

1. A lamp unit for a vehicular headlamp mounted on a front part of a vehicle, the lamp unit comprising:
   a light source including a plurality of light-emitting elements arrayed in a horizontal direction from left to right;
   a lens arranged in front of the light source; and
   an inner reflecting surface provided further on an inner side of the vehicle than the plurality of light-emitting elements, wherein
   the inner reflecting surface reflects light from an innermost light-emitting element located furthest to the inner side of the vehicle among the plurality of light-emitting elements, as reflected light onto the lens, and
   the lens emits light from the plurality of light-emitting elements toward a front of the vehicle in a plurality of partial light distribution patterns arrayed in the horizontal direction from left to right, and emits the reflected light from the inner reflecting surface toward the front of the vehicle as a diffused light distribution pattern, so that the diffused light distribution pattern is superimposed on an outermost partial light distribution pattern located furthest on an outer side of the vehicle among the plurality of partial light distribution patterns, and so that an edge of the diffused light distribution pattern on an outer side of the vehicle is located further on the outer side of the vehicle than an edge of the outermost partial light distribution pattern on the outer side of the vehicle, and
   an area of the diffused light distribution pattern is narrower than an area of the outermost partial light distribution pattern.

2. The lamp unit for a vehicular headlamp according to claim 1, wherein the inner reflecting surface reflects light from a next innermost light-emitting element located adjacent to the innermost light-emitting element onto an area other than the lens.

3. The lamp unit for a vehicular headlamp according to claim 2, wherein the inner reflecting surface is formed of a freeform surface, one or more curved surfaces, one or more flat surfaces, or any combination thereof, reflects light from the innermost light-emitting element onto an effective portion of the lens, the effective portion being located further to an inner side of the vehicle than an optical axis of the lens and above the optical axis of the lens, and reflects light from the next innermost light-emitting element onto an area other than the effective portion of the lens, the area being located above the optical axis of the lens.

4. The lamp unit for a vehicular headlamp according to claim 1, the lamp unit comprising: an outer reflecting surface provided further on an outer side of the vehicle than the plurality of light-emitting elements, wherein the outer reflecting surface reflects light from an outermost light-emitting element located furthest to an outer side of the vehicle among the plurality of light-emitting elements, as reflected light onto the lens, and the lens emits the reflected light from the outer reflecting surface toward a front of the vehicle as an additional light distribution pattern, to add the reflected light to an innermost partial light distribution pattern located furthest to an inner side of the vehicle among the plurality of partial light distribution patterns.

5. The lamp unit for a vehicular headlamp according to claim 4, wherein the outer reflecting surface is formed from an ellipsoidal surface in which a first focal point is located on the outermost light-emitting element and a second focal point is located on an incident surface of the lens, and reflects light from the outermost light-emitting element onto an effective portion of the lens, the effective portion being located further to an outer side of the vehicle than light from the innermost light-emitting element which is reflected light from the inner reflecting surface.

6. The lamp unit for a vehicular headlamp according to claim 4, the lamp unit comprising:

a reflector arranged between the light source and the lens, wherein the reflector includes a main reflecting surface that reflects light from each of the plurality of light-emitting elements onto the lens, and the lens superimposes the light from the plurality of light-emitting elements and light from the main reflecting surface and emits obtained light toward a front of the vehicle as a plurality of partial light distribution patterns.

7. The lamp unit for a vehicular headlamp according to claim 6, wherein the reflector includes the main reflecting surface provided on a body of the reflector, the inner reflecting surface provided on a left side of the reflector, and the outer reflecting surface provided on a right side of the reflector.

8. A vehicular headlamp mounted on a left side and a right side of a front part of a vehicle, the vehicular headlamp comprising:

a lamp housing and a lamp lens that form a lamp chamber, and the lamp unit for a vehicular headlamp according to claim 1, being arranged in the lamp chamber.

9. A lamp unit for a vehicular headlamp mounted on a front part of a vehicle, the lamp unit comprising:

a light source including a plurality of light-emitting elements arrayed in a horizontal direction from left to right;

a lens arranged in front of the light source; and an inner reflecting surface provided further on an inner side of the vehicle than the plurality of light-emitting elements, wherein the inner reflecting surface reflects light from an innermost light-emitting element located furthest to the inner side of the vehicle among the plurality of light-emitting elements, as reflected light onto the lens, and the lens emits light from the plurality of light-emitting elements toward a front of the vehicle in a plurality of partial light distribution patterns arrayed in the horizontal direction from left to right, and emits the reflected light from the inner reflecting surface toward the front of the vehicle as a diffused light distribution pattern, so that the diffused light distribution pattern is superimposed on an outermost partial light distribution pattern located furthest on an outer side of the vehicle among the plurality of partial light distribution patterns, and so that an edge of the diffused light distribution pattern on an outer side of the vehicle is located further on the outer side of the vehicle than an edge of the outermost partial light distribution pattern on the outer side of the vehicle, and the inner reflecting surface reflects light from a next innermost light-emitting element located adjacent to the innermost light-emitting element onto an area other than the lens.

10. The lamp unit for a vehicular headlamp according to claim 1, wherein the lamp unit is an adaptive-driving-beam type lamp unit, each of the plurality of light-emitting elements is configured to be controlled for turning on/off or increasing/decreasing light intensity in response to a signal from a control device, and when the innermost light-emitting element is controlled, a high-beam light distribution pattern including the diffused light distribution pattern is dynamically changed in accordance with turning off or decreasing light intensity of the partial light distribution pattern.

* * * * *